US 6,725,305 B1

United States Patent
Lee et al.

(10) Patent No.: US 6,725,305 B1
(45) Date of Patent: Apr. 20, 2004

(54) METHOD AND APPARATUS FOR USING A BUS AS A DATA STORAGE NODE

(75) Inventors: Hyun Lee, Allentown, PA (US); David W. Potter, Allentown, PA (US); Lai Q. Pham, Center Valley, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/474,412

(22) Filed: Dec. 29, 1999

(51) Int. Cl.[7] ............................................. G06F 13/00
(52) U.S. Cl. ...................................................... 710/107
(58) Field of Search .............................. 326/86; 710/107

(56) References Cited

U.S. PATENT DOCUMENTS

| 4,774,422 A | * | 9/1988 | Donaldson et al. ............ 326/15 |
| 5,148,047 A | * | 9/1992 | Spohrer ....................... 326/83 |
| 5,230,067 A | * | 7/1993 | Buch ........................... 710/107 |
| 5,511,170 A | * | 4/1996 | Abdoo .......................... 710/100 |
| 6,026,473 A | * | 2/2000 | Cross et al. ............. 365/230.04 |
| 6,330,651 B1 | * | 12/2001 | Kawaguchi et al. ......... 711/154 |
| 2002/0059493 A1 | * | 5/2002 | Williams et al. ............ 710/305 |

* cited by examiner

Primary Examiner—Paul R. Myers
(74) Attorney, Agent, or Firm—Synnestvedt & Lechner LLP

(57) ABSTRACT

The present invention is a method and apparatus for dynamically holding valid data logic levels on a bus by taking advantage of the inherent storage capacity of the bus. The bus speed is increased by eliminating the use of active bus keepers and null cycles. Instead, a two phase clock is used, the bus drivers drive data onto the bus during the first phase of the clock and are turned off at the beginning of the second phase of the bus clock. The receiving device latches the data during the second phase of the bus clock. Accordingly, there is no need for a null cycle or a bus keeper circuit, yet there is no bus contention between consecutive drivers nor is there a floating node condition.

15 Claims, 2 Drawing Sheets

METHOD AND APPARATUS FOR USING A BUS AS A DATA STORAGE NODE

FIELD OF THE INVENTION

The invention pertains to data buses for electronic circuits. More particularly, the invention pertains to data busses for system-on-a-chip (SoC) integrated circuits.

BACKGROUND OF THE INVENTION

The use of busses (e.g., address busses and data busses) to provide a single data path that is shared by a plurality of data processing devices, such as memories, microprocessors, micro controllers, digital signal processors (DSPs), and peripheral devices is, of course, well known. Busses are most commonly formed on printed circuit boards and interconnect a plurality of devices, for example, integrated circuits, mounted on the printed circuit board. The busses may also run out to connectors, such as on a backplane of a personal computer, in order to allow peripheral devices to be coupled to the bus.

Recently, integrated circuit manufacturers have begun producing single chips containing multiple device cores of the type, e.g., memories, micro controllers, DSPs, and microprocessors, that traditionally were embodied on different chips mounted on a PCB and interconnected by one or more busses that ran on the PCB. Such a chip is commonly termed a system-on-a-chip or SoC.

The core devices within SoCs still must communicate with each other. Accordingly, SoCs also frequently incorporate busses to provide data paths to interconnect the multiple core devices on the chip. The busses on SoCs, however, comprise conductor traces on the chip and thus tend to be much shorter in length and less sensitive to noise than printed circuit board busses. A typical SoC that would include one or more busses might be a SoC including a processor or multiprocessor that connects to several peripheral devices and/or several memory blocks (SRAM, DRAM, PROM and ROM).

Floating nodes is a problem commonly associated with a node, such as a bus bit line, that can alternately be driven by a plurality of drivers and can occur when no drivers are actively driving a node. When a node is not actively driven, it is connected to power and ground only through the high impedance of non-conducting n and p transistors of the drivers that can drive the bus and the gate inputs of the receiving devices coupled to the bus. The voltage on the receiver input gates can drift to a critical level, $V_{crit}$, that will cause the n and p transistors of the receivers to conduct simultaneously. This establishes a low impedance path between power and ground through the receiving device which can be a source of wasted power and possibly even destruction of the device.

In CMOS technology, the floating node problem exists usually because of one or more of three problems, namely, (1) design oversight, (2) decoding simplification, and (3) bus turn around time (e.g., null cycles). Design oversight can occur when driver select signals are not decoded to select a default driver for one or more combinations of signal values. Such oversights can be simply a mistake or may occur when a pre-existing design is modified for a new application and a bus driver that is no longer needed in the new design is removed from the circuit.

Floating node conditions also can be caused when the signals that select a bus driver are intentionally not decoded. This can occur when there is a large number of signals that select the bus driver and the decode logic is simplified by way of not decoding one or more default selections.

Another cause of a floating node condition is bus turn around time specifications which often are incorporated into designs in order to prevent bus contention. Specifically, when multiple drivers can drive a single node (e.g., a bus bit line), care must be taken in the bus access protocol to prevent two devices from driving the bus simultaneously. One driver must be completely turned off before the next driver is turned on because, if one driver is trying to drive the bus to a logic low level while another driver is trying to drive it to a logic high level, a very low impedance path between power and ground can be established which can destroy the device. Bus contention can occur at the point where one bus driver is turning off and another is turning on simultaneously. Specifically, it requires some finite period of time to turn a driver off or on. Differences in the delays of different drivers turning on and off and differences in the skew of the control signals selecting the drivers makes it extremely difficult to ensure that bus contention will not occur if one driver is switched off on the same clock phase that the next driver is switched on. Thus, turning drivers on and off in the same phase of a clock can cause transient bus contention.

Bus turn around time, or null cycle, is a scheme by which driver-to-driver bus contention is prevented. It refers to an allotted period of time in the bus access protocol when all drivers are turned off, i.e., the time between one driver switching off and the next driver switching on. Accordingly, bus protocols commonly include null cycles between switching of drivers on a bus. Null cycles (or bus turn around time) is the most likely source of floating nodes.

While the insertion of null cycles eliminates the problem of bus contention, it raises the problem of floating nodes and the aforementioned problems inherent thereto.

Accordingly, in both traditional busses and SoC busses, bus keepers (or bus holders) are often incorporated into the design. A bus keeper is a feedback circuit that prevents a node (e.g., a bit of a bus) from floating. The purpose of the bus keeper is to ensure that the bus bits are always driven to a valid logic level and, more particularly, to hold the immediately preceding driven logic level on the line.

The bus driver in the feedback circuit of a conventional bus keeper essentially drives the bus with the same data that had most recently previously existed on the bus, but with a weaker signal strength than the drivers of the data processing devices that had previously driven the bus. Thus, the previously driven logic level is maintained during null cycles, but when the next data processing device starts to drive the bus at the end of the null cycle, its strong driver easily overcomes the weak driver of the bus keeper.

These conventional bus keepers have several significant drawbacks. First, because they are essentially bus drivers, they still cause some bus contention, albeit not as bad as the contention between two strong drivers. Nevertheless, the contention causes excess power dissipation, and slower data transitions on the bus. Further, conventional bus keeper designs typically cannot easily be migrated between circuit designs because a conventional bus keeper must be designed with transistors specifically designed and scaled to provide the correct balance relative to the transistors of the strong drivers of the data processing devices of the particular circuit.

Also, the use of null cycles slows down the bus. Particularly, no new data can be driven onto the bus during the null cycle. Null cycles can comprise 30%–40% of the bus bandwidth.

Another solution known in the prior art is to avoid busses altogether and instead use multiplexers. However, multiplexers introduce gate delays in the data path and add substantially to circuit area due to the substantially increased number of wires needed to form the many data paths associated with the use of multiplexers.

SUMMARY OF THE INVENTION

The present invention takes advantage of the inherent charge storage characteristics of busses, and particularly those fabricated in CMOS technology, in order to eliminate the need for null cycles and a bus keeper. Particularly, a bus node typically has a small amount of capacitance associated with it such that it will hold a previously asserted logic level for a short period of time. In system-on-a-chip integrated circuits, bus speeds can be much faster than conventional busses that run across printed circuit boards. Accordingly, the data rate for busses on SoCs can be quite fast so as to take full advantage of the inherent charge storage characteristics of the busses.

In accordance with the present invention, data is driven on the bus by the bus driver of the particular core device for the first half (or phase) of a clock cycle. The driver is turned off at the intermediate clock edge of the clock cycle before the data is latched at the receiving device. The inherent charge storage characteristics of the bus hold that data value valid for the second half (or phase) of the clock rate. The receiving apparatus latches the data during the second phase of the bus clock cycle, i.e., after the driver is turned off. Because there is no active bus keeper or null cycles, the disadvantages inherent with the use of a bus keeper and null cycles are eliminated. By taking advantage of the inherent charge storage characteristics of the bus nodes and the high bus speeds capable with current technology (particularly, systems-on-a-chip), the bus does not have time to float to a critical voltage. In accordance with the present invention, bus bandwidth can be increased dramatically because of the elimination of null cycles.

DETAILED DESCRIPTION OF THE INVENTION

In accordance with the present invention, bus turnaround time, i.e., the time required between one bus driver turning off and the next bus driver turning on, is greatly reduced by eliminating null cycles between driver transitions.

While the present invention is not limited to use with busses on system-on-a-chip integrated circuits, it is subject to certain timing constraints which are easily achievable with respect to the very short busses that are inherent to SoCs. While such timing constraints can possibly be met by conventional busses which run on PCBs, it would be much more difficult.

Figure 1:
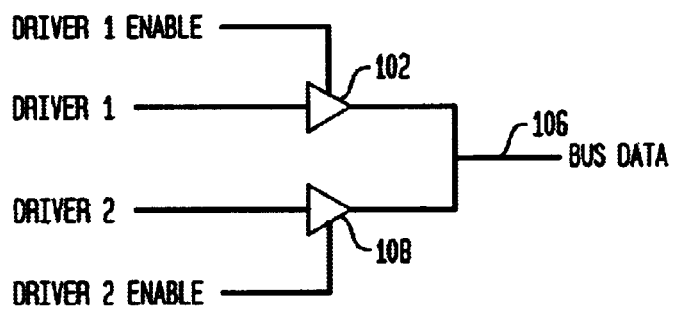
FIG. 1 is a circuit diagram of a bus architecture in accordance with the prior art.
Figure 2:
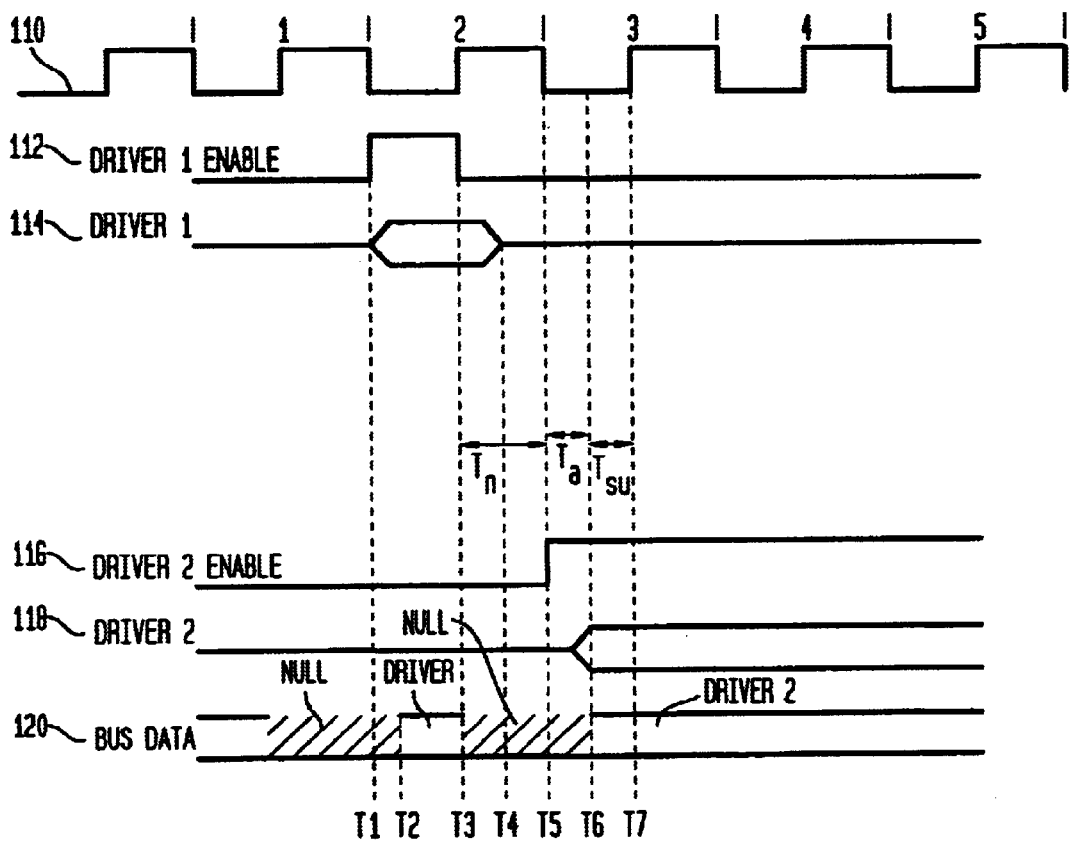
FIG. 2 is a timing diagram describing bus timing in accordance with the prior art circuit of FIG. 1.

FIGS. 1 and 2 are a circuit diagram and a timing diagram, respectively, illustrating a conventional bus timing protocol. The bus clock 110 is a two phase clock with the failing edge defining the leading edge of the clock cycles. Driver 102 associated with a first device core can drive the bus 106. Likewise, driver 108 associated with a second device core also can drive the bus.

Let us assume that driver 102 drives data onto the bus for clock cycle 2 and that driver 108 will commence driving the bus at clock cycle 3. As shown on line 112, the driver enable signal for driver 102 is thus asserted for the first half of clock cycle 2, i.e. from T1 to T3. Due to circuit delay, the data driven onto the bus by driver 102 is not instantaneously valid at time T1, but becomes valid at time T2, a short delay after being enabled, as shown on bus data time line 120. The driver 102 enable signal, line 112, goes unasserted at time T3, which is the intermediate, rising, edge of the clock cycle. Accordingly, valid data is actively driven onto the bus driver 102 from T2 to time T3, as shown on time line 120. As with driver enablement, the driver 102 takes some finite amount of time (from T3 to T4) to completely de-assert the bus, as can be seen on both time lines 114 and 120. A forced null period, $T_n$, is provided to prevent bus contention for the entire second half of the clock cycle. The next driver may not assert data on the bus during this period, i.e., from time T3 to time T5. Then, at the leading edge of the next clock cycle (time T5), driver 108 is enabled as shown on time line 116. As with driver 102, there is a small delay period, $T_a$, after the enable signal is asserted before the data out of driver 108 becomes valid at time T6, as shown on time lines 118 and 120. The delay period $T_a$ is the time required for the second driver 108 to assert the bus to a valid logic level after being enabled. After the bus propagation delay, $T_{su}$, the data reaches the receiving device. $T_{su}$ is termed the setup time of the receiving circuit and comprises the bus propagation delay period for the data to travel over the bus from the transmitting device to the receiving device. As can be seen from FIG. 2, a requirement of the conventional bus timing protocol illustrated in FIG. 2 and is that the data be received at the destination device before the driver is turned off, i.e., before the second half of the clock cycle begins at time T7. Thus, $T_a+T_{su}$ must be no longer than half a clock cycle, e.g., T7-T5. FIG. 1B illustrated $T_a+T_{su}$ lasting until the end of the first phase of the clock cycle at time T7. However, as noted above, this Figure illustrated the maximum allowed duration of $T_a+T_{su}$, but it may be of shorter duration.

Accordingly, in the conventional circuit illustrated by FIG. 2, where the second half of the clock cycle is a null cycle for switching drivers, the data must reach the destination device during the first half of the clock cycle. Even though this timing requirement is dictated by needs which exist only when drivers are switching, as a practical matter, if the timing requirements must be met for switching drivers, then they will be met at all times. Accordingly, $T_a+T_{su}$ must be less than or equal to half of a clock cycle at all times regardless of whether the second half of the clock cycle is actually used as a null cycle or not for any particular cycle.

The second half of the clock cycle, e.g., from T5 to T7, comprises the null period during which no data may be actively driven on the bus. However, as previously noted, a bus keeper might be employed to hold the bus at the same logic level to which it was driven during the first half of the clock cycle to prevent floating nodes.

The present invention takes advantage of the fact that a logic level driven on the bus will remain valid on the bus for a short period of time after the driver is turned off due to the inherent capacitance of the bus. The invention is particularly applicable where the delay period for data to travel over the bus and be latched at the destination circuit, i.e., $T_{su}$, is short enough to take full advantage of this characteristic.

The present invention allows substantial increases of speed (i.e., decreases in bus data cycle time) by taking advantage of the inherent capacitance of the bus and allowing a receiving device to latch the data after the driver of the transmitting device is turned off, but while the data is still valid due to bus capacitance.

This arrangement has two significant effects which allow the bus clock rate, and thus the bus data transfer rate, to be increased significantly and, in fact, by as much as 2 to 4 fold over the prior art. First, the delay period between turning a driver on and the data reaching the destination device no longer needs to be less than or equal to half of a clock cycle. In accordance with the present invention, the delay period between a driver turning on and the data being latched at the destination device must merely be less than or equal to an entire clock cycle. Secondly, there is no need for a null period between different drivers driving the bus. Specifically, by disabling the driver before the data is received, new data can be driven onto the bus immediately after the previous data is received.

Figure 3:
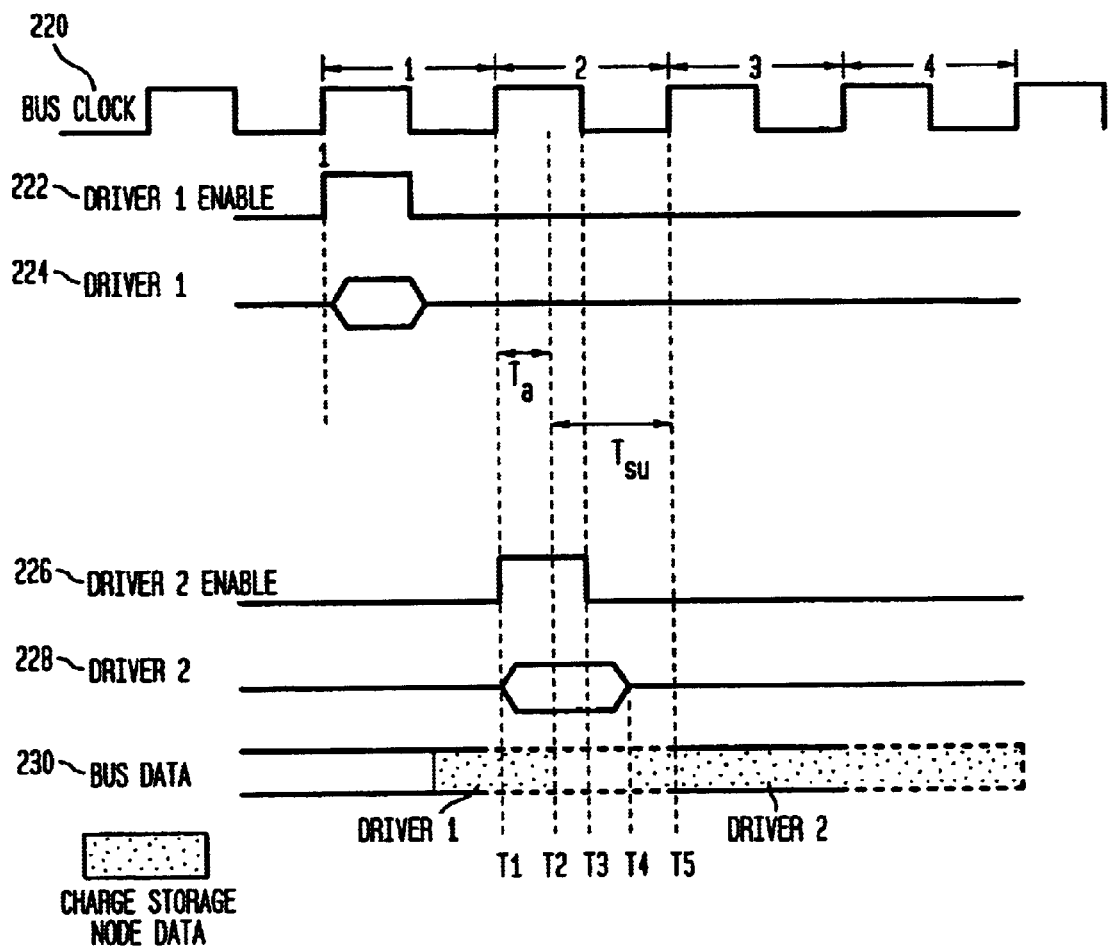
FIG. 3 is a timing diagram illustrating operation of the bus architecture in accordance with the present invention.

FIG. 3 is a circuit and timing diagram, illustrating bus operation in accordance with the present invention. The invention uses the same driver architecture illustrated in FIG. 1, but the driver enable signals are different as will be described fully hereinbelow. The bus clock 220 is a two phase clock with the rising edge being the leading edge of a clock cycle. Driver 102 associated with a first device core can drive the bus 106. Likewise, driver 108 associated with a second device core also can drive the bus.

Let us assume that driver 102 drives data onto the bus for at least clock cycle 2 and that driver 108 will commence driving the bus at clock cycle 3. The period between turning the driver off and the receiving device latching the data must be less than the minimum time possible for the data on the bus to become invalid after a driver stops driving the bus (hereinafter termed the minimum data decay period). Accordingly, as shown in the timing diagram of FIG. 3, in accordance with the present invention, driver 108 is enabled (line 228) at the leading edge of the bus clock, e.g., at time T1. A short delay period thereafter, at time T2, the data on the bus (see lines 228 and 230) becomes valid. At the intermediate edge of the clock cycle, e.g., time T3, the driver is disabled and the driver starts to turn off. A short delay period thereafter, at time T4, the driver is completely off and no longer driving data onto the bus (see lines 228 and 230). However, even though the driver is completely off, the data will remain valid some period into the second phase of the clock, and preferably throughout the entire second phase of the clock cycle until the leading edge of the next clock cycle at time T5. The receiving device latches the data during the second half of the clock cycle.

Thus, the duration of the first phase of the clock can be much shorter than in the conventional bus protocol illustrated in FIG. 2. The period $T_a$ for the data to become valid after a driver is enabled should be less than or equal to the duration of the first phase of the clock, i.e., T3-T1. The receiving device then has until the end of the clock cycle to latch the data. In other words, $T_a+T_{su'}$ must be less than or equal to the entire clock cycle (i.e., T5-T1), whereas, in the prior art, $T_a+T_{su}$ had to be less than half of the clock cycle. Accordingly, the clock speed can be doubled relative to the prior art.

Accordingly, the invention is particularly suitable for system-on-a-chip integrated circuits, where the busses are extremely short and, thus, the data cycles can be commensurately fast. Moreover, CMOS integrated circuits are particularly suitable due to their inherent high impedance state when all drivers are off. While not impossible, it is difficult to meet the timing constraints of the present invention in a conventional multiple chip circuit in which the bus must run between chips on a PCB. Multiple chip circuits typically have output delay and load impedance parameters that make it difficult to keep bus data cycle times short enough to take advantage of the inherent charge storage characteristics of the bus. Output delays for multiple chip circuits usually include input buffer delays, output buffer delays, and board level clock skew. It is not normally possible for boards to sustain low enough leakage current and low enough capacitive and inductive coupling with its environment to guarantee that logic levels can be held by the bus capacitance long enough to take advantage of the present invention.

While we have described one or more specific embodiments of the invention assuming a two phase bus clock data cycle and a 50% bus clock duty cycle, neither is a requirement of the present invention. In accordance with the present invention, (1) the bus clock should have at least two phases, (2) data should be available on the bus before the last phase of the cycle begins, and (3) the bus driver should be disabled before the clock phase in which the data is latched at the receiving device.

It is reasonable to expect that for many system-on-a-chip integrated circuits, bus data will be valid before the end of the last clock phase. In general, macro blocks for SoCs are designed to be reusable so that output delays must work well with a variety of other macro blocks.

While the above-described parameters describe a practical embodiment of the invention, the invention may be more conceptually considered to require that (1) bus drivers be disabled before the receiving device latches the data, (2) the duration from the time the driver is disabled to the time the data is received is less than the period that the inherent bus capacitance maintains the previously driven valid logic level, and (3) no new data be driven onto the bus until the previous data is latched by the receiving device.

It should be obvious to those of skill in the art that in all discussion of timing contained herein, including that in connection with prior art circuits, the timing parameters described above refer to the maximum possible corresponding periods for the given circuit.

Furthermore, the clock phases need not be of equal duration (e.g., 50% duty cycle). In fact, in a preferred embodiment of the invention, each phase is as short as possible while still meeting the necessary time parameters. For instance, assuming a two phase clock, the first phase may be as short as $T_a$ and the sum of the first and second phases may be as short as $T_a+T_{su'}$.

The present invention provides maximum bus bandwidth for a given clock speed (or alternately much shorter bus cycles, i.e., faster clock and data rate) because it does not waste time with null cycles. For instance, the data can be available for twice the amount of time relative to the clock period compared to the above-described prior art bus circuits. By eliminating null cycles and allowing the receiving device to latch data during the last phase of the clock, bus data transfer rates can be increased by as much as a factor of 2. The invention avoids bus contention between multiple bus drivers or between bus drivers and the bus keeper and eliminates null cycles without increasing switching transients.

While a bus keeper is generally unnecessary with the present invention, the invention can be employed in association with a bus keeper without loss of its advantages. One, particular bus keeper circuit that is particularly useful is the bus keeper circuit disclosed in U.S. patent application Ser. No. 09/474,411 filed on even date herewith, entitled Clock Gated Bus Keeper assigned to the same assignee as the present application.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

We claim:

1. A method of transferring data over a bus between a transmitting device and a receiving device, said method comprising the steps of:

(1) turning said transmitting device on to drive data onto said bus by asserting an enable signal that controls a driver of said transmitting device;

(2) turning said transmitting device off by de-asserting said enable signal; and (3) latching said data at said receiving device after said enable signal is de-asserted;

wherein no buskeeper is employed.

2. A method of transferring data over a bus between a transmitting device and a receiving device, said method comprising the steps of:

(1) clocking said bus with a clock having a clock cycle comprising at least a first phase and a second phase;

(2) turning said transmitting device on to drive data on said bus by asserting an enable signal that controls a driver of said transmitting device; and (3) turning said transmitting device off by de-asserting said enable signal before said receiving device latches said data;

wherein no buskeeper is employed.

3. The method of claim 2 wherein step (2) comprises turning said transmitting device on during said first phase of said clock cycle and wherein step (3) comprises turning said transmitting device off during said second phase of said clock cycle.

4. The method of claim 3 wherein step (2) comprises turning said transmitting device on responsive to a transition into said first phase of said clock cycle and wherein step (3) comprises turning said transmitting device off responsive to a transition into said second phase of said clock cycle.

5. The method of claim 2 wherein step (2) comprises enabling a driver associated with said transmitting device and step (3) comprises disabling said driver associated with said transmitting device.

6. The method of claim 3 wherein step (2) comprises enabling a driver associated with said transmitting device and step (3) comprises disabling said driver associated with said transmitting device.

7. The method of any of claim 5 wherein no null period is provided between clock cycles.

8. The method of any of claims 5 and 6 wherein no null period is provided between data transmitted by different transmitting devices.

9. The method as set forth in claim 2 wherein said clock cycle has a duration no less than the sum of a period for said driver to drive valid data onto said bus from enablement and a period for said data to travel over said bus and be received by said receiving device.

10. The method as set forth in claim 2 wherein said bus may be driven by any of a plurality of transmitting devices and said data may be received by any of a plurality of receiving devices and wherein said clock cycle has a duration no less than a maximum potential period for a driver to drive valid data onto said bus from enablement plus a maximum potential period for data to travel from a transmitting device and be received by a receiving device over said bus.

11. The method of any one of claim 3, 7, and 10 wherein said bus is embodied in a system-on-a-chip integrated circuit.

12. The method of claim 11 wherein said integrated circuit is fabricated using CMOS transistors.

13. The method of claim 2 wherein said bus clock has a 50% duty cycle.

14. The method of claim 4 wherein said first phase of said clock cycle has a duration of at least a period from enablement of said transmitting device until valid data is asserted on said bus.

15. The method as set forth in claim 4 wherein said bus may be driven by any of a plurality of transmitting devices and said data may be received by any of a plurality of receiving devices and wherein said first phase of said clock cycle has a duration of at least a maximum period from enablement of any transmitting device until valid data is asserted on said bus.

* * * * *